United States Patent Office 3,280,023
Patented Oct. 18, 1966

3,280,023
CATALYTIC CRACKING PROCESS
Robert W. Roberts, Woodland Hills, Calif., and Ardis L. Anderson, Ponca City, Okla., assignors to Continental Oil Company, Ponca City, Okla., a corporation of Oklahoma
No Drawing. Filed Apr. 19, 1963, Ser. No. 274,312
4 Claims. (Cl. 208—85)

This invention relates to treatment of hydrocarbon streams containing aluminum alkoxides and/or oxygenated organic impurities. In one aspect, the invention relates to treatment of a by-product stream resulting from the manufacture of aluminum alkoxides from alkyl aluminum compounds, by catalytic cracking, so as to remove certain objectionable impurities and produce a useful hydrocarbon product. In another aspect, the invention relates to a process for purifying a hydrocarbon stream contaminated with aluminum compounds and oxygenated organic compounds, by catalytic cracking.

In the method of manufacturing alcohols which has been disclosed in the literature by Dr. Karl Ziegler, the first step is the so-called growth reaction:

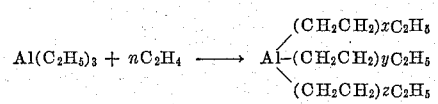

($n = x+y+z$, and each of $x$, $y$ and $z$ ranges from 0 to about 14)

The growth reaction involves the reaction between a low molecular weight mono-olefin or alkylene such as ethylene, propylene, butene, etc. with a low molecular weight aluminum trialkyl, such as for example, a trialkylaluminum having the alkyl substituents containing from about 2 to 4 carbon atoms. The resultant growth product comprises a trialkyl compound in which the alkyl groups vary widely in molecular weight. The growth reaction can be carried out by passing the mono-olefin such as ethylene through trialkylaluminum such as triethylaluminum, preferably in the presence of a diluent under a variety of reaction conditions. The temperature of reaction can be from about 65° to 150° C. and at a pressure of about 200 to 5000 p.s.i.g., and more usually a temperature of about 90° to 120° C. and at a pressure of about 1000 to 3500 p.s.i.g.

The growth reaction provides a statistical distribution of alkyl chain lengths characterized by the Poisson relationship which can be expressed as follows:

$$P_{(n)} = \frac{m^n e^{-m}}{n!}$$

wherein $P_{(n)}$ represents the probability that a certain hydrocarbon radical will be formed by "$n$" additions of ethylene to the aluminum ethyl bond originally present and "$m$" is the mean number of additions of ethylene per growing chain. The following table contains an illustration of a type of distribution which is obtained in the growth reaction:

TABLE

| Alkyl group: | Weight percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth reaction may be carried out in a substantially non-olefinic (inert) diluent which can be paraffin, cycloparaffin, aromatic hydrocarbon or hydrocarbon fraction, such as, for example, isooctane, cyclohexane, benzene, xylene, kerosene, alkylate, naphtha, and the like. The diluent aids in controlling the temperature of the reaction which is exothermic and also serves as a solvent for the growth product. The diluent employed in the growth reaction can also be the alpha-olefin which was described hereinabove.

The growth product is then oxidized to aluminum alkoxides as the next step in the alcohol synthesis, customarily in the presence of an inert saturated hydrocarbon solvent.

Immediately following this stage of the process it may be found advisable to distill or strip the crude alkoxide product, removing therefrom lower boiling substances which include the saturated hydrocarbon solvent, olefins, lower molecular weight alkoxides, and trace quantities of such substances as aldehydes, alcohols, esters, peroxides, and other oxygenated organic compounds. This crude mixture, which can be referred to as a light distillate from aluminum alkoxide purification or aluminum alkoxide solvent stripper overhead, represents an appreciable waste in the alcohol process unless it is converted into a useful product.

It is an object of this invention to provide an economical method for conversion of this crude by-product stream into a material consisting essentially of hydrocarbons substantially free from oxygen and aluminum-containing impurities. It is another object of this invention to provide a process for purifying a hydrocarbon stream contaminated with oxygenated organic compounds and aluminum compounds. Other aspects, objects and the several advantages of this invention will become apparent to one skilled in the art upon study of this disclosure and the appended claims.

According to the invention, there is provided a process for manufacture of a hydrocarbon product from a stream comprising hydrocarbon, aluminum compounds, and oxygenated organic compounds which comprises subjecting said stream to catalytic cracking and recovering from said cracking a deoxygenated hydrocarbon product. There is further provided in a process wherein an alkyl-aluminum compound containing alkyl groups of 2–4 carbon atoms is contacted with a low molecular weight olefin of 2–4 carbon atoms under conditions effective to promote growth of said alkyl groups to a carbon content of up to about 30 carbon atoms per alkyl group, the resulting growth product is contacted in the presence of an inert hydrocarbon diluent with oxygen under conditions effective to produce aluminum alkoxides, and the resulting mixture is subjected to separation for removal of said diluent, the improvement which comprises contacting removed diluent containing oxygenated organic compounds and aluminum compounds with a cracking catalyst under cracking conditions of temperature and pressure, and recovering from the cracking a purified hydrocarbon containing at most trace amounts of oxygenated organic compounds and aluminum compounds.

In a plant in which alcohols are manufactured by the Ziegler process the typical aluminum alkoxide solvent stripper overhead stream is rich in olefins and contains about 3 to 5 weight percent oxygen present in the form of oxygen-containing organic compounds. In addition to the various oxygenated organic compounds, a small quantity of aluminum alkoxide is also present in this stream, probably as a result of entrainment during the stripping operation. Results of preparation of various blends of this crude stream into typical petroleum refinery products have shown blending to be an unacceptable means for disposing of this material. In every instance the blend was shown to have prohibitive gum content, poor color, and an objectionable odor. In addition, the by-product stream is deficient in heating value, as compared with kerosene. Catalytic cracking offers a means of reducing the oxygen content, as well as the aluminum content, of the material to yield a hydrocarbon product with high heat content, less odor, and with more usefulness for the purposes for which saturated and unsaturated hydrocarbons are customarily employed.

The catalytic cracking contemplated according to this invention comprises the various methods known in the art, such as fixed bed catalytic cracking, fluidized bed catalytic cracking, and transport bed catalytic cracking. The catalyst can be any of the known cracking catalysts, such as Filtrol cracking catalyst (an acid-activated montmorillonite clay available from The Filtrol Corporation). Among the catalysts suitable for cracking according to this invention are Nalcat B and Nalcat 783 from National Aluminate Company, Aerocat 2000 from American Cyanamid Company, Filtrol 100 from The Filtrol Corp., Houdry S–90, S–65, S–36, S–16, and M–46 from Houdry Process Corp., and Davison C–1, F–1, and F–2 from Davison Chemical Co.; these catalysts are all silica-alumina with a low content of other inorganics, and are available in various particle and pellet sizes having a wide range of surface areas.

Conditions suitable for cracking the stripped diluent stream according to this invention are those normally used in commercial practice. Aluminum alkoxides present in the stripper overhead stream do not appear to adversely affect the cracking catalyst. That is, there was not observed during experimental runs either attrition or loss of activity attributable to the alkoxides, and excessive coking did not occur. In fact, it is believed that deposition of small amounts of alumina on the catalyst may have a beneficial effect. In the event that some deactivation does occur, however, the aluminum compounds can be removed from the stripper overhead stream prior to charging to the cracking unit if desired. This can be effected, for example, by fractional distillation or acid-water washing. Mineral acids, such as sulfuric acid in a concentration between about 2 and about 40 weight percent are quite satisfactory for this treatment. Acid strength in excess of about 40 weight percent produces a char and causes discoloration of the stream. Coke laydown on the catalyst does not present a problem. The product resulting from treatment by the method of this invention can be separated by fractional distillation into useful hydrocarbon fractions which are indistinguishable from cracked refinery products of comparable boiling ranges, and can be employed for similar purposes.

In order to illustrate the present invention still more fully, the following example is provided.

*Example*

A sample of kerosene solvent contaminated with oxygenated hydrocarbons and aluminum alkoxides was catalytically cracked in a fixed bed cracking unit. This kerosene stream had the following properties:

|  | Kerosene solvent |
|---|---|
| Aluminum, wt. percent | 0.063 |
| Gravity: ° API | 46.6 |
| Specific | 0.7945 |
| Sulfur, wt. percent | 0.02 |
| Bromine No., gm./100 gm. | 12 |
| Hydroxyl, percent —OH | 1.85 |
| Carbonyl, p.p.m. —C=O | 612 |
| Saponification No., mg. KOH/gm. | 9.8 |
| Distillation, ASTM D–86: | |
| IBP | 127 |
| 5 | 234 |
| 10 | 284 |
| 20 | 337 |
| 30 | 354 |
| 40 | 384 |
| 50 | 404 |
| 60 | 423 |
| 70 | 446 |
| 80 | 473 |
| 90 | 497 |
| 95 | --- |
| E.P. | --- |

Cracking conditions were 920° F., atmospheric pressure, and a space velocity of 2.0 wt. oil/hr./wt. catalyst. The cracked product was cut into two fractions by distillation; the total liquid stream and the two fractions had the following properties:

YIELDS

| | |
|---|---|
| Gas, wt. percent of charge | 11.64 |
| 430° F. end point gasoline: | |
| Wt. percent of charge | [1] 59.8 |
| Vol. percent | 70.0 |
| Post 430° F. end point: | |
| Wt. percent of charge | 27.38 |
| Vol. percent | 30.4 |
| Coke on catalyst, wt. percent: | |
| Of catalyst | 2.36 |
| Of charge | 1.18 |

[1] Includes 2.0% water.

INSPECTION

| | Total Liquid Stream | Gasoline to 430° F. | Post 430° F. Gasoline |
|---|---|---|---|
| Gravity: | | | |
| °API | 52.5 | 56.3 | 44.1 |
| Specific | 0.7690 | 0.7535 | 0.8055 |
| Sulfur, wt. percent | 0.01 | <0.01 | 0.05 |
| Bromine Number | 26 | 40 | 2.8 |
| Saponification Number | 0 | 0 | 0 |
| Carbonyl Number | 14 | Nil | 52 |
| Hydroxyl Number | 0 | Nil | Nil |
| Copper Strip | | 1A | 1B |
| ASTM Gum, mg./100 ml | | 1.2 | 0.2 |
| Octane No. F–1: | | | |
| Clear | | 61.4 | |
| +3 cc | | 79.3 | |
| Flash, PM °F | | | 190 |
| Viscosity, SSU at 100° F | | | 32.66 |
| Color, ASTM | | | 8+ |
| Pour Point, °F | | | Below −30 |
| Cloud Point, °F | | | Below −30 |
| Heating Value, B.t.u./lb | | | 19,420 |
| Aluminum, wt. percent | <0.005 | | |
| Distillation: | | | |
| IBP | | 82 | 350 |
| 5 | | 111 | 430 |
| 10 | | 138 | 440 |
| 20 | | 210 | 445 |
| 30 | | 302 | 450 |
| 40 | | 329 | 459 |
| 50 | | 359 | 462 |
| 60 | | 369 | 468 |
| 70 | | 379 | 475 |
| 80 | | 391 | 485 |
| 90 | | 412 | 515 |
| 95 | | 428 | 560 |
| E.P. | | 434 | 560 |

Other suitable diluents for the growth and oxidation steps include isooctane and light or heavy alkylate. Suitable cracking conditions are as follows:

|  | Preferred Conditions | Operable Ranges |
|---|---|---|
| Temperature, °F | 900–920 | 850–950 |
| Pressure, p.s.i.g. | 0–15 | 0–40 |
| Space velocity, wt./hr. wt. | 1.5–3 | 1–16 |

It can be seen from the data presented above that the product obtained by the method of this invention is not only equivalent to petroleum refinery hydrocarbon streams of comparable boiling range, but is of very high purity with respect to sulfur and oxygen content.

Other advantages and modifications which lie within the scope of the disclosed invention will be apparent to those who are skilled in the art. By way of illustration, other dilute acids such as hydrochloric, nitric and phosphoric may be employed for removal of aluminum, depending on economic considerations. In the growth reaction, the lower trialkylaluminum preferably contains alkyl groups of 2–4 carbon atoms, and is preferably subjected to growth with a lower olefin of 2–4 carbon atoms.

What is claimed is:

1. In a process wherein an alkylaluminum compound containing alkyl groups of 2–4 carbon atoms is contacted with a low molecular weight olefin of 2–4 carbon atoms under conditions effective to promote growth of said alkyl groups to a carbon content of up to about 30 carbon atoms per alkyl group, the resulting growth product is contacted in the presence of an inert hydrocarbon diluent with oxygen under conditions effective to produce aluminum alkoxides, and the resulting mixture is subjected to separation for removal of said diluent, the improvement which comprises contacting removed diluent containing oxygenated organic compounds and aluminum compounds with a solid consisting essentially of cracking catalyst under cracking conditions of temperature and pressure, and recovering from the cracking a purified hydrocarbon containing at most trace amounts of oxygenated organic compounds and aluminum compounds.

2. The process of claim 1 wherein said separation for removal of diluent comprises stripping, and wherein the stripped diluent prior to cracking contains at least about 600 p.p.m. carbonyl and one weight percent hydroxyl.

3. The process of claim 1 wherein said cracking is effected at a temperature between about 900 and 1000° F. and about atmospheric pressure, and wherein the catalyst comprises an acid-activated montmorillonite.

4. The process of claim 3 wherein the diluent is kerosene.

References Cited by the Examiner

UNITED STATES PATENTS

| 2,128,994 | 9/1938 | Fischer et al. | 208—49 |
| 2,430,249 | 11/1947 | Ruthruff | 208—49 |
| 2,618,613 | 11/1952 | Kimberlin et al. | 208—118 |
| 2,742,405 | 4/1956 | Mattox | 208—118 |
| 2,800,427 | 7/1957 | Junk et al. | 208—90 |
| 3,184,520 | 5/1965 | Roberts | 208—251 |

DELBERT E. GANTZ, *Primary Examiner.*

A. D. SULLIVAN, *Examiner.*

H. LEVINE, *Assistant Examiner.*